Patented Apr. 26, 1927.

1,626,398

UNITED STATES PATENT OFFICE.

HARRY ESSEX, OF SYRACUSE, NEW YORK, AND ALGER L. WARD, OF UPPER DARBY, PENNSYLVANIA, ASSIGNORS TO E. I. DU PONT DE NEMOURS & COMPANY, OF WILMINGTON, DELAWARE, A CORPORATION OF DELAWARE.

PROCESS OF MAKING POLYHYDROXY CARBON COMPOUNDS.

No Drawing. Original application filed November 22, 1919, Serial No. 340,073. Divided and this application filed May 25, 1926. Serial No. 111,635.

This invention relates to the production of polyhydroxy compounds from organic compounds containing at least one pair of carbon atoms united by a double bond. In general our invention comprises converting an unsaturated organic compound into a halohydrin, in such a way that the resulting reaction mixture contains water and an alkali forming metal carbonate such as sodium or calcium carbonate in addition to said halohydrin, and then heating said reaction mixture to bring about hydrolysis of the halohydrin. One particular embodiment of the invention is in the production of glycerin from allyl alcohol. This application is a division of our application Serial No. 340,073 filed in the United States Patent Office November 22, 1919, Patent Number 1,594,608, granted August 3, 1926.

In an investigation to find processes most suitable for the commercial synthesis of glycerol we discovered that allyl chloride could be converted, with good yields, into glycerol dichlorhydrins by slowly passing carbon dioxide into a mixture of allyl chloride and a water solution of an alkali, or alkaline earth, metal hypochlorite, and that the resulting reaction mixture was so constituted that conversion of the dichlorhydrins into glycerol could be readily effected simply by heating the mixture, preferably with the addition of a further quantity of carbonate. This process is described and claimed in our Patent No. 1,477,113 dated December 11, 1923.

We have now found that other carbon compounds containing an ethylenic linkage may be converted in an analogous manner first into the corresponding halohydrins, and then by hydrolysis, and without isolation of the halohydrins, into the corresponding alpha-glycols. The compounds which may be caused to undergo the above described transformation vary widely in molecular structure and in chemical and physical properties, but they are all characterized by possessing a pair of doubly linked carbon atoms so situated with respect to the rest of the molecule as to be capable of combining additively with the OH and Cl radicals of hypochlorous acid to form chlorhydrins. Examples of such compounds are (1) olefines, such as ethylene, propylene, butylene, etc.; (2) aryl-substituted alkylenes, such as styrole (phenylethylene or vinylbenzene); and (3) substituted olefines with miscellaneous substituents, such as gammahydroxypropylene (allyl alcohol).

Our new process may be illustrated by the following examples:

I. Ethylene glycol.

To prepare ethylene glycol according to this method 482 cu. ft. of ethylene and 241 cu. ft. of carbon dioxide, measured at standard conditions, are passed into a cold 5% hypochlorite solution containing 100 lbs. of sodium hypochlorite. The ethylene should preferably be admitted to the solution in the form of very fine bubbles, which may be accomplished by forcing the ethylene through the pores of unglazed earthenware. The solution should be kept cold throughout the operation and the carbon dioxide admitted sufficiently slowly to keep low the concentration of free hypochlorous acid. The resulting solution of ethylene chlorhydrin is then heated to boiling under a reflux condenser and kept at this temperature for several hours. If a test shows that chlorates are absent, the ethylene glycol formed may be recovered by concentration and distillation. The reactions involved are:

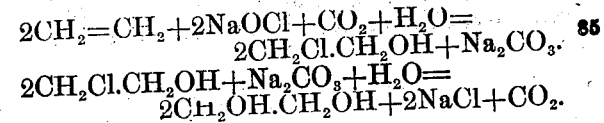

II. Phenyl glycol.

104 lbs. of styrole are added to 74.5 lbs. of sodium hypochlorite in water solution, the mixture vigorously stirred and carbon dioxide passed in, while keeping the mixture cool, until substantially all the hypochlorite has been decomposed. The chlorhydrin is then hydrolyzed to phenyl glycol by boiling the product under a reflux condenser. The reactions involved are:

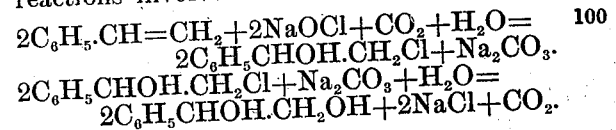

III. Glycerine from allyl alcohol.

58 lbs. of allyl alcohol are added to 74.5 lbs. of sodium hypochlorite in water solution, the mixture vigorously stirred and carbon dioxide passed into the cooled solution until hypochlorites have disappeared. The glycerine monochlorhydrin produced is hydrolyzed to glycerine by boiling the product under a reflux condenser. The principal reactions involved are:

$$2CH_2OH.CH=CH_2 + 2NaOCl + CO_2 + H_2O$$
$$= 2CH_2OH.CHCl.CH_2OH. + Na_2CO_3.$$
$$2CH_2OH.CHCl.CH_2OH + Na_2CO_3 + H_2O =$$
$$2CH_2OH.CHOH.CH_2OH. + 2NaCl + CO_2.$$

As evidence of the wide applicability of this process there may be mentioned the production, in a manner similar to that described in the preceding examples, of phenylglyceric acid $$(C_6H_5.CHOH.CHOH.COOH)$$

from cinnamic acid $$(C_6H_5.CH:CH.COOH),$$

of dihydroxystearic acid from oleic acid, and of trihydroxystearic acid from ricinoleic acid.

Various changes may be made in the process set forth in detail above without departing from our invention. Thus in place of the alkali-forming metal hypochlorite referred to above, there may be used other hypohalites such as sodium, calcium, or barium hypobromite; the resulting halohydrins are then hydrolyzed to dihydroxy compounds by heating the reaction mixture as described in the specific examples.

We claim:—

1. The process of producing a polyhydroxy carbon compound which comprises causing a carbon compound containing a pair of doubly linked carbon atoms and an oxygen-containing substituent to combine with hypohalous acid in the presence of an alkali-forming metal carbonate to form a halohydrin, and heating the reaction mixture containing an alkali-forming metal carbonate to hydrolyze the halohydrin.

2. The process of producing a polyhydroxy carbon compound which comprises treating a mixture of a substituted olefine, having an oxygen-containing substituent, and a water solution of an alkali-forming metal hypochlorite, while keeping the mixture cool, with carbon dioxide to convert said hypochlorite into an alkali-forming metal carbonate and into hypochlorous acid under such conditions that said acid combines almost immediately with the substituted olefine to form the corresponding chlorhydrin, and then heating the resulting mixture to bring about a reaction between the water, the alkali-forming metal carbonate, and the chlorhydrin, and to thereby from an alkali-forming metal halide and a polyhydroxy derivative of said substituted olefine.

3. The process of producing glycerin which comprises causing allyl alcohol to combine with hypohalous acid in the presence of an alkali-forming metal carbonate to form a chlorhydrin, and heating the reaction mixture containing an alkali-forming metal carbonate to hydrolyze the chlorhydrin.

4. The process of producing glycerin which comprises passing carbon dioxide into a mixture of an aqueous sodium hypochlorite solution and allyl alcohol, while keeping the mixture cool, to form sodium carbonate and a chlorhydrin, and then heating the mixture until the chlorhydrin is hydrolyzed to gylcerin.

In testimony whereof we affix our signatures.

HARRY ESSEX.
ALGER L. WARD.